US010565418B2

(12) United States Patent
Osborne et al.

(10) Patent No.: US 10,565,418 B2
(45) Date of Patent: Feb. 18, 2020

(54) FINGERPRINT READER ON A PORTION OF A DEVICE FOR CHANGING THE CONFIGURATION OF THE DEVICE

(71) Applicant: Lenovo (Singapore) Pte. Ltd., New Tech Park (SG)

(72) Inventors: Christopher Miles Osborne, Cary, NC (US); Michael William Stuart Ripp, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/673,867

(22) Filed: Aug. 10, 2017

(65) Prior Publication Data
US 2017/0344791 A1 Nov. 30, 2017

Related U.S. Application Data

(63) Continuation of application No. 14/295,740, filed on Jun. 4, 2014, now Pat. No. 9,811,707.

(51) Int. Cl.
G06K 9/00 (2006.01)
G06F 3/01 (2006.01)
G06F 1/16 (2006.01)

(52) U.S. Cl.
CPC ....... *G06K 9/00013* (2013.01); *G06F 1/1616* (2013.01); *G06F 1/1643* (2013.01); *G06F 1/1684* (2013.01); *G06F 3/01* (2013.01)

(58) Field of Classification Search
None
See application file for complete search history.

(56) References Cited

U.S. PATENT DOCUMENTS

| 5,490,005 | A  | * | 2/1996 | Jueliger ............... G09G 3/3406 349/116 |
| 6,912,299 | B1 | * | 6/2005 | Hoshino ............ G06K 9/00013 340/5.53 |
| 6,959,507 | B2 |   | 11/2005 | Bazany et al. |
| 7,522,945 | B2 |   | 4/2009 | Kilpi et al. |
| 8,606,340 | B2 |   | 12/2013 | Pegg |
| 9,007,169 | B2 | * | 4/2015 | Lee ....................... G06F 1/1632 320/111 |
| 9,024,746 | B2 | * | 5/2015 | Burbank ................ A61B 5/117 340/521 |
| 2002/0180585 | A1 |   | 12/2002 | Kim et al. |
| 2003/0122792 | A1 | * | 7/2003 | Yamamoto .......... G06F 3/03547 345/173 |
| 2004/0156538 | A1 |   | 8/2004 | Greschitz et al. |

(Continued)

OTHER PUBLICATIONS

Srinivasan K. Ganapathi, "Systems and Methods for Biometric Authentication Circuit Offset from Front Surface of Device", related U.S. Appl. No. 14/921,320, Applicant's response to Non-Final Office Action filed Sep. 22, 2017.

(Continued)

*Primary Examiner* — Nancy Bitar
(74) *Attorney, Agent, or Firm* — John M. Rogitz; John L. Rogitz

(57) ABSTRACT

In one aspect, a device includes a first panel at least bearing a keyboard, a second panel at least bearing a display, and a fingerprint reader on at least a portion of at least one of the first and second panels. The portion is engageable by a user to transition the first panel away from the second panel.

16 Claims, 10 Drawing Sheets

(56) References Cited

U.S. PATENT DOCUMENTS

| | | | |
|---|---|---|---|
| 2005/0088417 A1* | 4/2005 | Mulligan | G06F 3/04886 345/173 |
| 2005/0134717 A1 | 6/2005 | Misawa | |
| 2005/0226468 A1 | 10/2005 | Deshpande et al. | |
| 2006/0110013 A1* | 5/2006 | Lee | G06F 3/0237 382/115 |
| 2008/0062662 A1* | 3/2008 | Iijima | G06F 1/162 361/752 |
| 2009/0083847 A1 | 3/2009 | Fadell et al. | |
| 2011/0130962 A1* | 6/2011 | Lindsey | G01C 21/36 701/533 |
| 2011/0267298 A1* | 11/2011 | Erhart | G06F 1/1626 345/173 |
| 2012/0019356 A1* | 1/2012 | Gagneraud | G06F 21/32 340/5.32 |
| 2012/0049309 A1 | 3/2012 | Kiyomoto et al. | |
| 2012/0127061 A1* | 5/2012 | Pegg | H04M 1/0247 345/1.1 |
| 2012/0258773 A1 | 10/2012 | Rivera et al. | |
| 2013/0091561 A1 | 4/2013 | Bruso et al. | |
| 2014/0140588 A1* | 5/2014 | Chou | G06K 9/0002 382/124 |
| 2014/0302818 A1* | 10/2014 | Fyke | G06F 21/32 455/411 |
| 2015/0135108 A1* | 5/2015 | Pope | G06K 9/00006 715/767 |
| 2015/0160760 A1* | 6/2015 | Sato | G06F 3/044 345/174 |
| 2015/0253918 A1* | 9/2015 | Algreatly | G06F 3/0414 345/174 |
| 2015/0356338 A1* | 12/2015 | Osborne | G06K 9/00013 382/124 |
| 2017/0242580 A1 | 8/2017 | Gdala | |

OTHER PUBLICATIONS

Srinivasan K. Ganapathi, "Systems and Methods for Biometric Authentication Circuit Offset from Front Surface of Device", file history of related U.S. Appl. No. 14/921,320, filed Oct. 23, 2015.

Srinivasan K. Ganapathi, "Systems and Methods for Biometric Authentication Circuit Offset from Front Surface of Device", related U.S. Appl. No. 14/921,320, Non-Final Office Action dated Feb. 28, 2018.

Srinivasan K. Ganapathi, "Systems and Methods for Biometric Authentication Circuit Offset from Front Surface of Device", related U.S. Appl. No. 14/921,320, Final Office Action dated Oct. 19, 2017.

Srinivasan K. Ganapathi, "System and Methods for Biometric Authentication Circuit Offset From Front Surface of Device", related pending U.S. Appl. No. 14/921,320, applicant's response to final office action filed Jan. 18, 2018.

Srinivasan K. Ganapathi, "Systems and Methods for Biometric Authentication Circuit Offset from Front Surface of Device", related U.S. Appl. No. 15/673,867, Final Office Action dated Aug. 9, 2018.

Srinivasan K. Ganapathi, "Systems and Methods for Biometric Authentication Circuit Offset from Front Surface of Device", related U.S. Appl. No. 14/921,320, Applicant's response to the Non-Final Office Action filed May 24, 2018.

* cited by examiner

FINGERPRINT READER ON A PORTION OF A DEVICE FOR CHANGING THE CONFIGURATION OF THE DEVICE

FIELD

The present application relates generally to fingerprint readers located on devices.

BACKGROUND

Fingerprint readers provide a way to identify and authenticate a user of a device. However, currently such identification and authentication often requires that aggravating, unnecessary, and/or burdensome steps be taken on the part of the user.

SUMMARY

Accordingly, in one aspect, a device includes a first panel at least bearing a keyboard, a second panel at least bearing a display, and a fingerprint reader on at least a portion of at least one of the first and second panels. The portion is engageable by a user to transition the first panel away from the second panel.

In another aspect, a method includes providing a first panel at least bearing a keyboard, providing a second panel at least bearing a display, and providing a fingerprint reader on at least a portion of at least one of the first and second panels. The portion is engageable by a user to transition the first panel away from the second panel.

In still another aspect, a first device includes a cover for a display of a touch-enabled device, and a fingerprint reader on at least a portion of the cover.

The details of present principles, both as to their structure and operation, can best be understood in reference to the accompanying drawings, in which like reference numerals refer to like parts, and in which:

DETAILED DESCRIPTION

Figure 1:
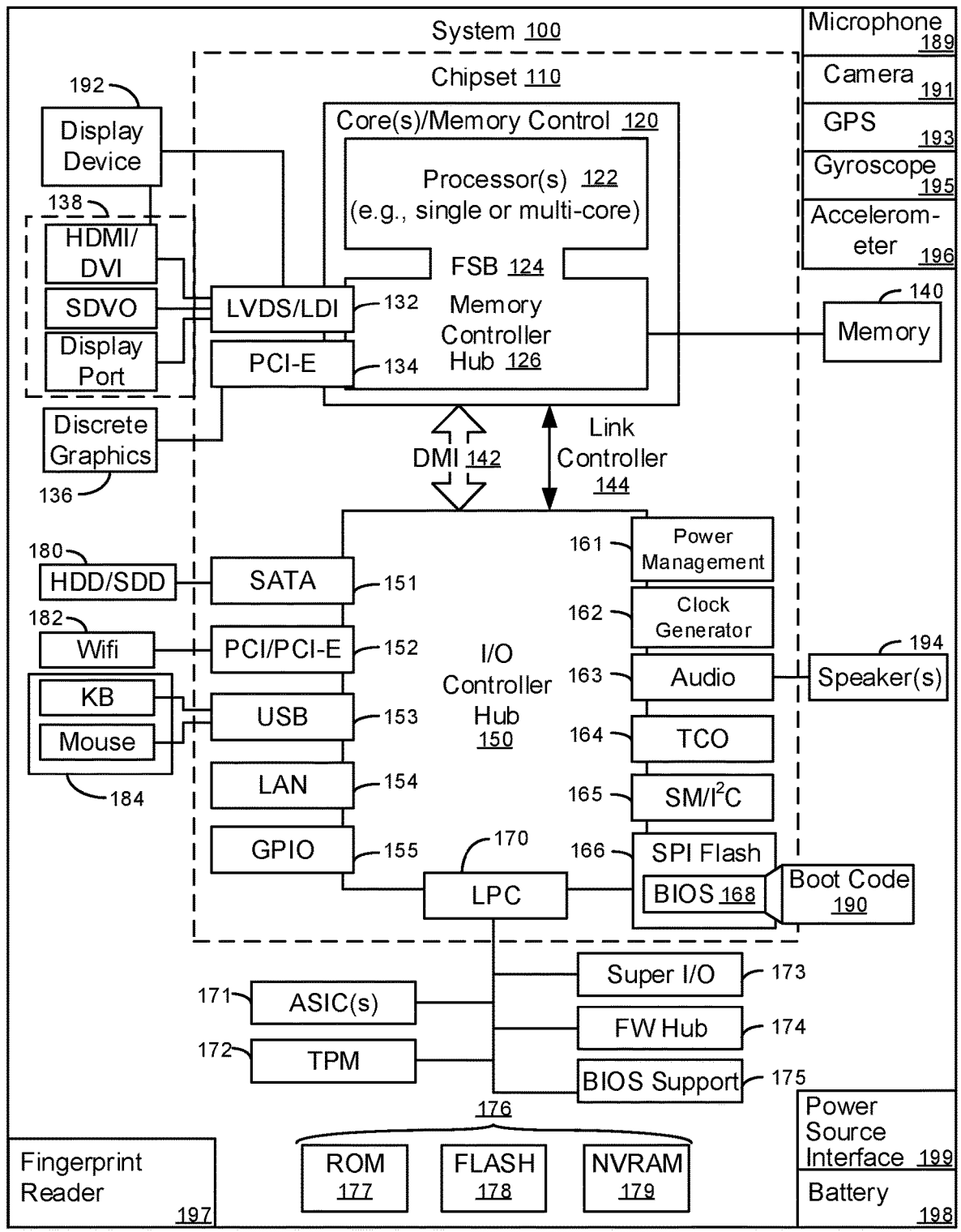
FIG. 1 is a block diagram of an example system in accordance with present principles.

This disclosure relates generally to device-based information. With respect to any computer systems discussed herein, a system may include server and client components, connected over a network such that data may be exchanged between the client and server components. The client components may include one or more computing devices including televisions (e.g. smart TVs, Internet-enabled TVs), computers such as desktops, laptops and tablet computers, so-called convertible devices (e.g. having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or other browser program that can access web applications hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by e.g. a module can be redistributed to other software modules and/or combined together in a single module and/or made available in a shareable library.

Logic when implemented in software, can be written in an appropriate language such as but not limited to C # or C++, and can be stored on or transmitted through a computer-readable storage medium (e.g. that may not be a carrier wave) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

"A system having one or more of A, B, and C" (likewise "a system having one or more of A, B, or C" and "a system having one or more of A, B, C") includes systems that have A alone, B alone, C alone, A and B together, A and C together, B and C together, and/or A, B, and C together, etc.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, it shows an example block diagram of an information handling system and/or computer system 100. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be e.g. a game console such as XBOX® or Playstation®.

As shown in FIG. 1, the system 100 includes a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 further includes a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including e.g. one of more GPUs). An example system may include AGP or PCI-E for support of graphics.

The I/O hub controller 150 includes a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 provide for communication with various devices, networks, etc. For example, the SATA interface 151 provides for reading, writing or reading and writing information on one or more drives 180 such as HDDs, SDDs or a combination thereof, but in any case the drives 180 are understood to be e.g. tangible computer readable storage mediums that may not be carrier waves. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

In addition to the foregoing, the system 100 is understood to include an audio receiver/microphone 189 in communication with the processor 122 and providing input thereto based on e.g. a user providing audible input to the microphone 189. A camera 191 is also shown, which is in communication with and provides input to the processor 122. The camera 191 may be, e.g., a thermal imaging camera, a digital camera such as a webcam, and/or a camera integrated into the system 100 and controllable by the processor 122 to gather pictures/images and/or video. In addition, the system 100 may include a GPS transceiver 193 that is configured to e.g. receive geographic position information from at least one satellite and provide the information to the processor 122. However, it is to be understood that another suitable position receiver other than a GPS receiver may be used in accordance with present principles to e.g. determine the location of the system 100.

Additionally, the system 100 may include a gyroscope 195 for e.g. sensing and/or measuring the orientation of the system 100, and an accelerometer 196 for e.g. sensing acceleration and/or movement of the system 100.

Still in reference to FIG. 1, also shown on the system 100 is a fingerprint reader and/or sensor 197. The fingerprint reader 197 may be used to gather data pertaining to and/or images of the fingerprint of a user. In some embodiments, the fingerprint reader 197 may be e.g. an optical fingerprint reader. Still further, at least battery 198 is shown, along with at least one power source interface and/or charging interface 199 for interfacing the system 100 and/or battery 198 with a power source and/or for charging the battery 198, such as e.g. a power outlet in a wall.

Figure 2:
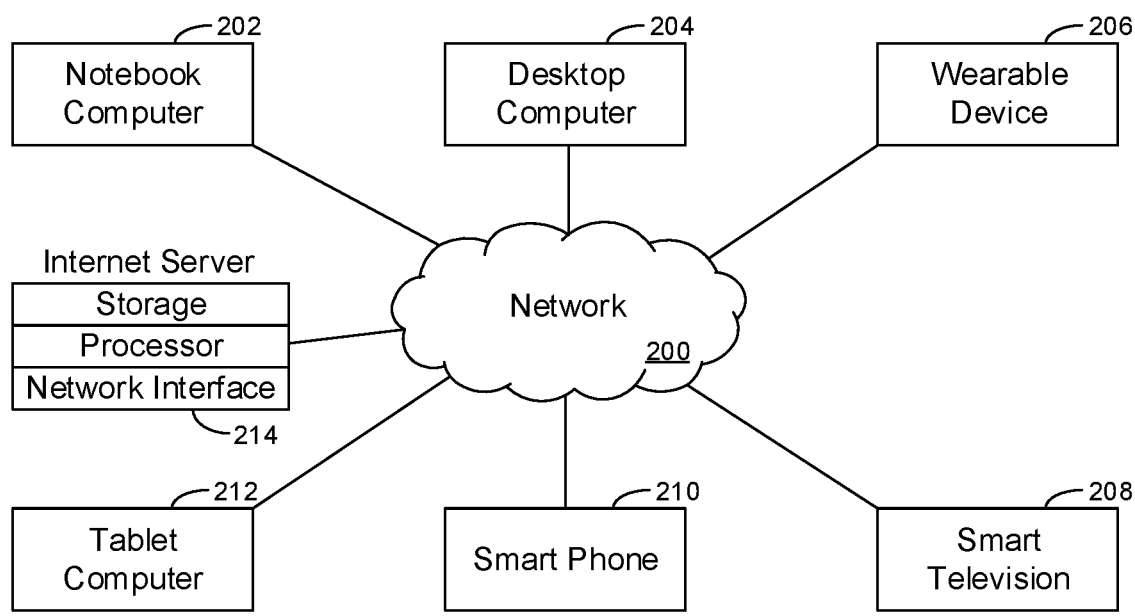
FIG. 2 is a block diagram of a network of devices in accordance with present principles.

Before moving on to FIG. 2, it is to be understood that an example client device or other machine/computer may include fewer or more features than shown on the system 100 of FIG. 1. In any case, it is to be understood at least based on the foregoing that the system 100 is configured to undertake present principles.

Turning now to FIG. 2, it shows example devices communicating over a network 200 such as e.g. the Internet in accordance with present principles. It is to be understood that e.g. each of the devices described in reference to FIG. 2 may include at least some of the features, components, and/or elements of the system 100 described above. In any case, FIG. 2 shows a notebook computer 202, a desktop computer 204, a wearable device 206 such as e.g. a smart watch, a smart television (TV) 208, a smart phone 210, a tablet computer 212, and a server 214 in accordance with present principles such as e.g. an Internet server that may e.g. provide cloud storage accessible to the devices 202-212. It is to be understood that the devices 202-214 are configured to communicate with each other over the network 200 to undertake present principles.

Figure 3:
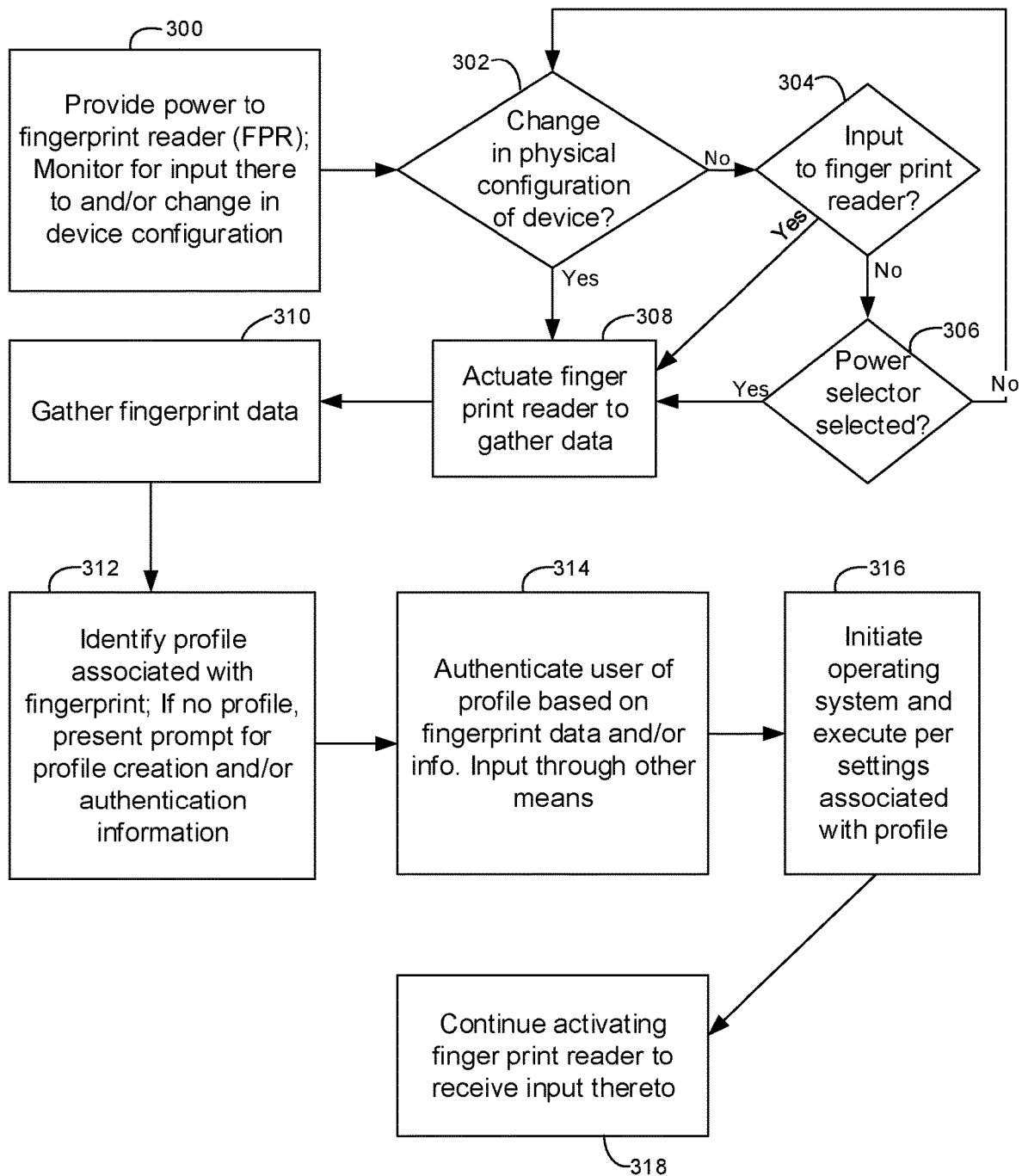
FIG. 3 is a flow chart showing an example algorithm in accordance with present principles.

Referring to FIG. 3, it shows example logic that may be undertaken by a device such as the system 100 in accordance with present principles. Beginning at block 300, the logic provides power to a fingerprint reader (FPR) on the device undertaking the logic of FIG. 3 (referred to below as the "present device") and/or actuates the FPR to monitor for input thereto. The foregoing may be done at block 300 without e.g. a guest operating system being executed at the present device and/or with the present device being in a powered down and/or suspended state. In addition to or in lieu of the foregoing, but also at block 300, the logic may monitor the present device for a change in the physical orientation and/or configuration of the present device, such as e.g. a laptop being changed from a closed configuration to an at least partially open configuration.

After block 302 the logic proceeds to decision diamond 302, where the logic determines whether such a change in physical orientation and/or configuration has occurred. An affirmative determination causes the logic to proceed to block 308, where the logic actuates the FPR to gather data as will be described further below. However, a negative determination instead causes the logic to move to decision diamond 304. At diamond 304 the logic determines whether fingerprint input has been provided (e.g. by a user) to the FPR. An affirmative determination causes the logic to proceed to block 308. However, a negative determination instead causes the logic to move to decision diamond 306. At diamond 306 the logic determines whether a power selector (e.g. power button) has been selected to e.g. power on the present device, awaken the present device from a suspended or hibernation state (or other low-power state), etc. A negative determination causes the logic to revert back to diamond 302 and proceed therefrom. However, an affirmative determination causes the logic to proceed to the aforementioned block 308.

At block 308, the logic actuates the FPR to monitor for input thereto to gather data based on input to the FPR (e.g. gather an image(s) of and/or data pertaining to a thumb print or index finger print of a user), and then at block 310 the logic gathers the image(s) and/or data. The logic then proceeds to block 312, where the logic identifies a profile associated with the fingerprint data (e.g. associated with a user from whom the fingerprint data was derived based on input to the FPR). Note that also at block 312, should a profile not be identified, the logic may present a prompt and/or user interface (UI) on the present device for the person whom provided the input to the FPR to create a profile for present purposes and/or provide authentication information to e.g. logon to the present device. Thus, e.g. the prompt may contain fields for a username and password to be input, and/or may also prompt a user to provide input to the FPR from specific fingers on the user's right or left hand e.g. for further authentications based on fingerprint input to the FPR.

In any case, from block 312 the logic proceeds to block 314, at which the logic authenticates a user of a profile identified at block 312 based on the fingerprint data, and/or (e.g. if no profile was identified at block 312) authenticates the user based on (e.g. authentication) information input through other means such as the prompt discussed above. After block 314, the logic proceeds to block 316, where the logic initiates one or more e.g. guest operating systems and executes them per settings for the one or more guest operating systems associated with the profile of the user (e.g. automatically without further user input after providing input to the FPR). E.g., based on settings for the profile identified at block 312, the logic may initiate a particular guest operating system (GOS), as well as other applications executable using the GOS such as e.g. a music player and an email application for a particular email account associated with the identified profile and/or user. After block 316, the logic continues to block 318 where the logic may, e.g. while continuing to execute the GOS, continue actuating the FPR to monitor for input thereto.

Figure 4:
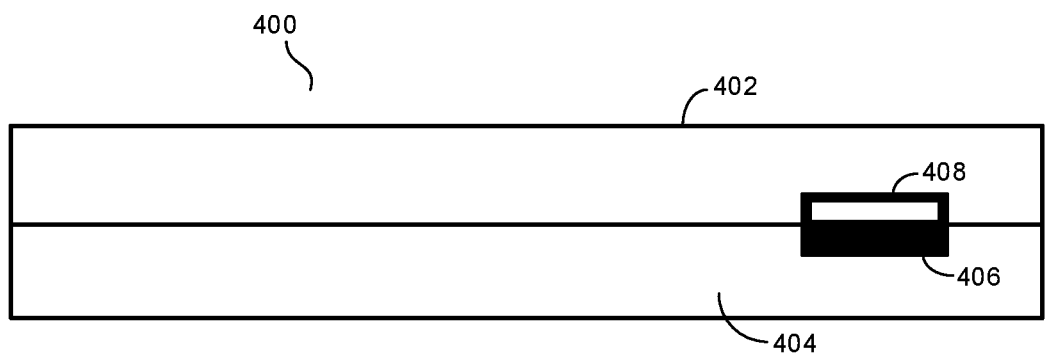
FIGS. 4 and 7 are front elevational views of example devices in accordance with present principles.

Now in reference to FIG. 4, it shows a front elevational view of an example device 400 which in the present instance is shown as being a laptop computer. As may be appreciated from FIG. 4, the device 400 is shown as being in a closed configuration (e.g. a closed configuration of a so-called "clamshell" device) where an upper panel 402 and a lower panel 404 at least in part establish the device 400. In non-limiting embodiments, the upper panel 402 may include a display such as e.g. a touch-enabled display, while the lower panel 404 may include a keyboard.

In addition to the foregoing, the device 400 may also include a recessed portion 406 in the housing of the device that is at least in part established by both the upper panel 402 and lower panel 404 as shown. Furthermore, a fingerprint reader 408 is positioned on structure of the recessed portion established by the upper panel 402. The recessed portion 406 is also shown in FIG. 5, which shows a side elevational view of the device 400.

Figure 5:
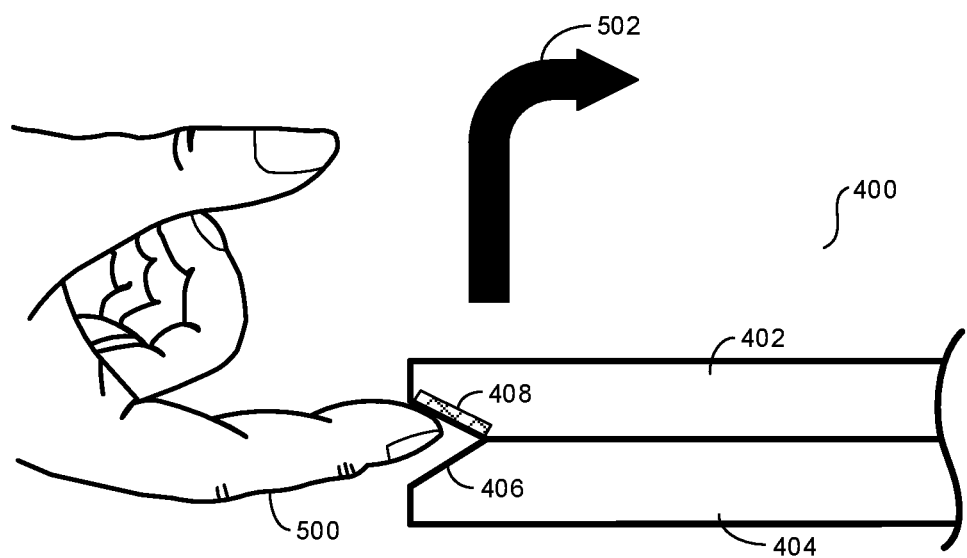
FIGS. 5 and 8 are side elevational views of example devices in accordance with present principles.

Thus, as may be appreciated from FIG. 5, the recessed portion is engageable by a user 500 to transition at least a portion of the upper panel 402 away from at least a portion of the lower panel 404 in the direction represented by the arrow 502. Note that in the example shown, the fingerprint reader is positioned on the portion of the recessed portion 406 established by the upper panel 402 to thus receive input from the user 500 at the recessed portion 406 e.g. simultaneously with the user 500 making contact with the recessed portion 406 as shown to transition the upper panel 402 away from the lower panel 404 to thus provide input to the fingerprint reader and to transition the device 400 in a single (e.g. continuous) gesture or action.

Figure 6:
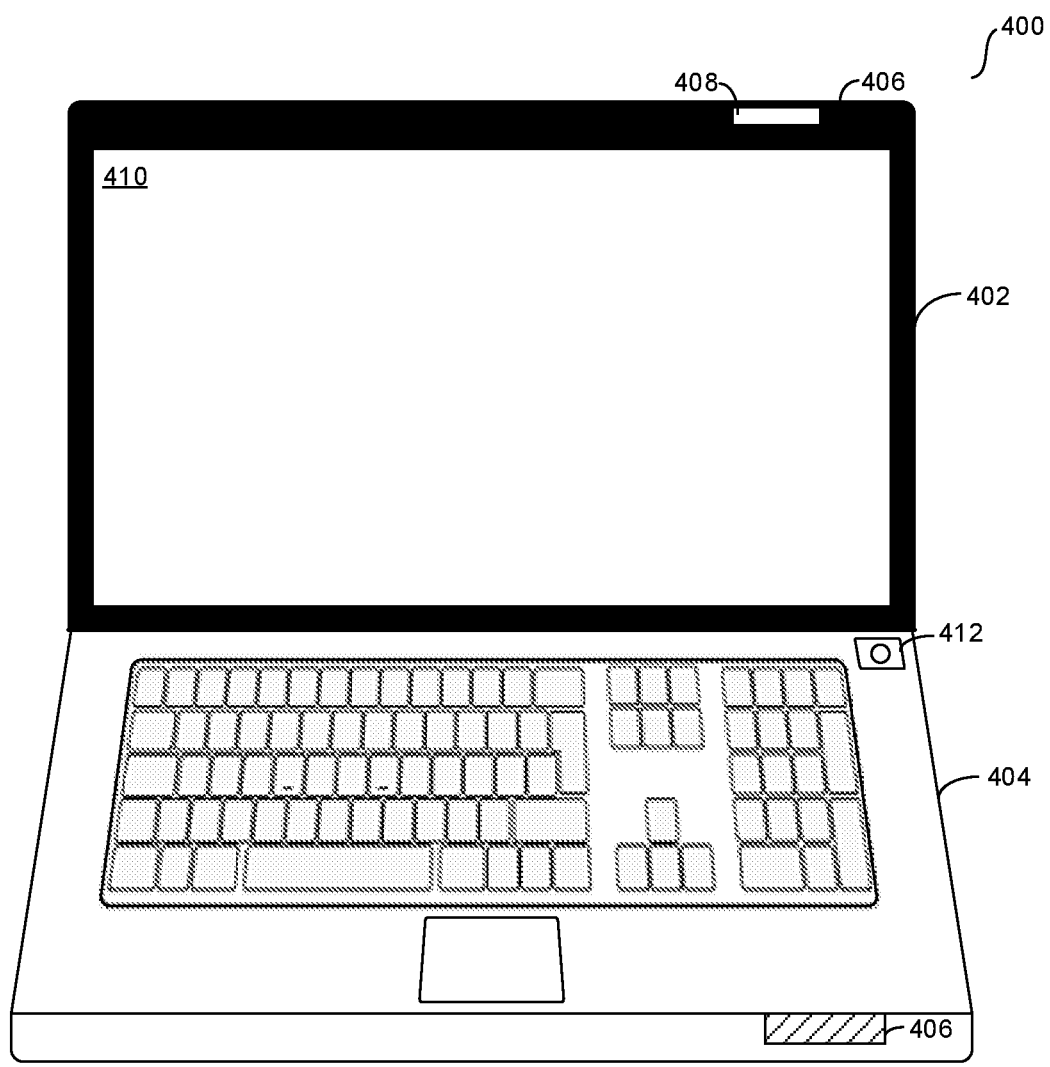
FIGS. 6 and 9 are perspective views of example devices in accordance with present principles.

Before moving on to FIG. 6, it may be appreciated from FIGS. 4 and 5 that the device 400 as shown in these figures is in a configuration where the upper panel 402 and the lower panel 404 establish respective planes that at least substantially parallel to each other, and indeed may in fact be parallel to each other. Also before describing FIG. 6, it is to be understood that in some embodiments, while the device 400 is in the "closed" configuration shown, the fingerprint reader 408 may be provided by the device 400 with power to receive fingerprint input even if e.g. the device is in a hibernation mode, a suspend mode, another low-power mode, an "off" mode, and/or while e.g. a guest operating system is not currently executing.

Now in reference to FIG. 6, it may be appreciated that the device 400 has been transitioned by the user 500 to an at least partially open configuration where the upper panel 402 and the lower panel 404 no longer establish planes at least substantially parallel to each other but e.g. oblique relative to each other or perpendicular relative to each other. Note that both the upper panel 402 and lower panel 404 still respectively establish at least a portion of the recessed portion 406, and also note that the fingerprint reader 408 is positioned on the upper panel 402 above a display 410 of the device relative to an upright perspective of the device 400. Note that the fingerprint reader 408 may be continue monitoring for input in the configuration of FIG. 6 e.g. while a GOS executes and/or the user manipulates the device 400 after initiation of an operating system and/or after opening the device 400 to the configuration shown in FIG. 6.

Still in reference to FIG. 6, also note that a power selector 412 is shown, which is understood to be selectable to e.g. turn the device 400 on (e.g. to a fully powered on configuration), to awaken the device from a suspended state and/or hibernation state (or other low-power state), to initiate execution (e.g. "bootup") of one or more operating systems of the device 400 (e.g. guest operating systems such as Windows, Linux, Android, or Macintosh operations systems), etc. Note that the power selector 412 also includes a fingerprint reader positioned thereon, it being understood that the fingerprint reader is positioned on the power selector 412 to give a unitary appearance and/or tactile feel to the power selector 412 and furthermore is positioned structurally to have a unitary surface also including e.g. at least the exposed surface of the power selector 412 so that the fingerprint reader is both e.g. depressible to invoke the selector 412 to e.g. power on the device 400 and to (e.g. simultaneously) invoke the fingerprint reader to provide fingerprint input thereto in a single (e.g. continuous) gesture or action.

Figure 7:
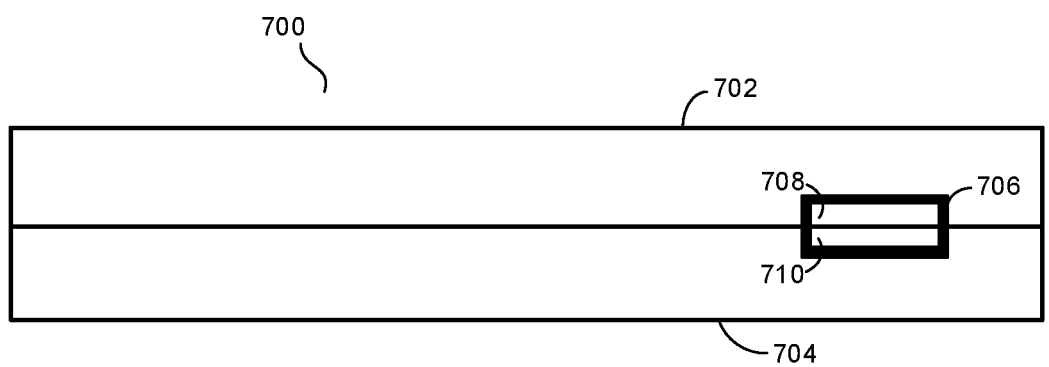
Figure 8:
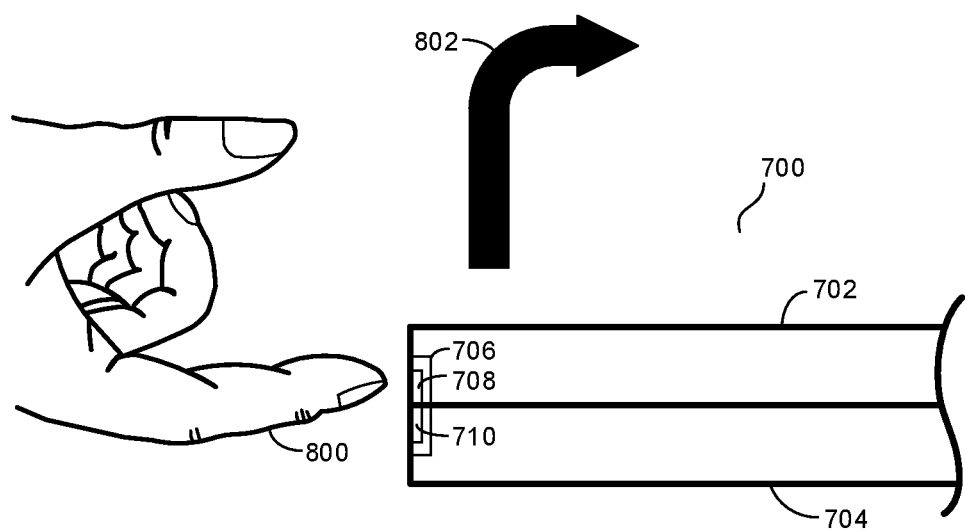
Figure 9:
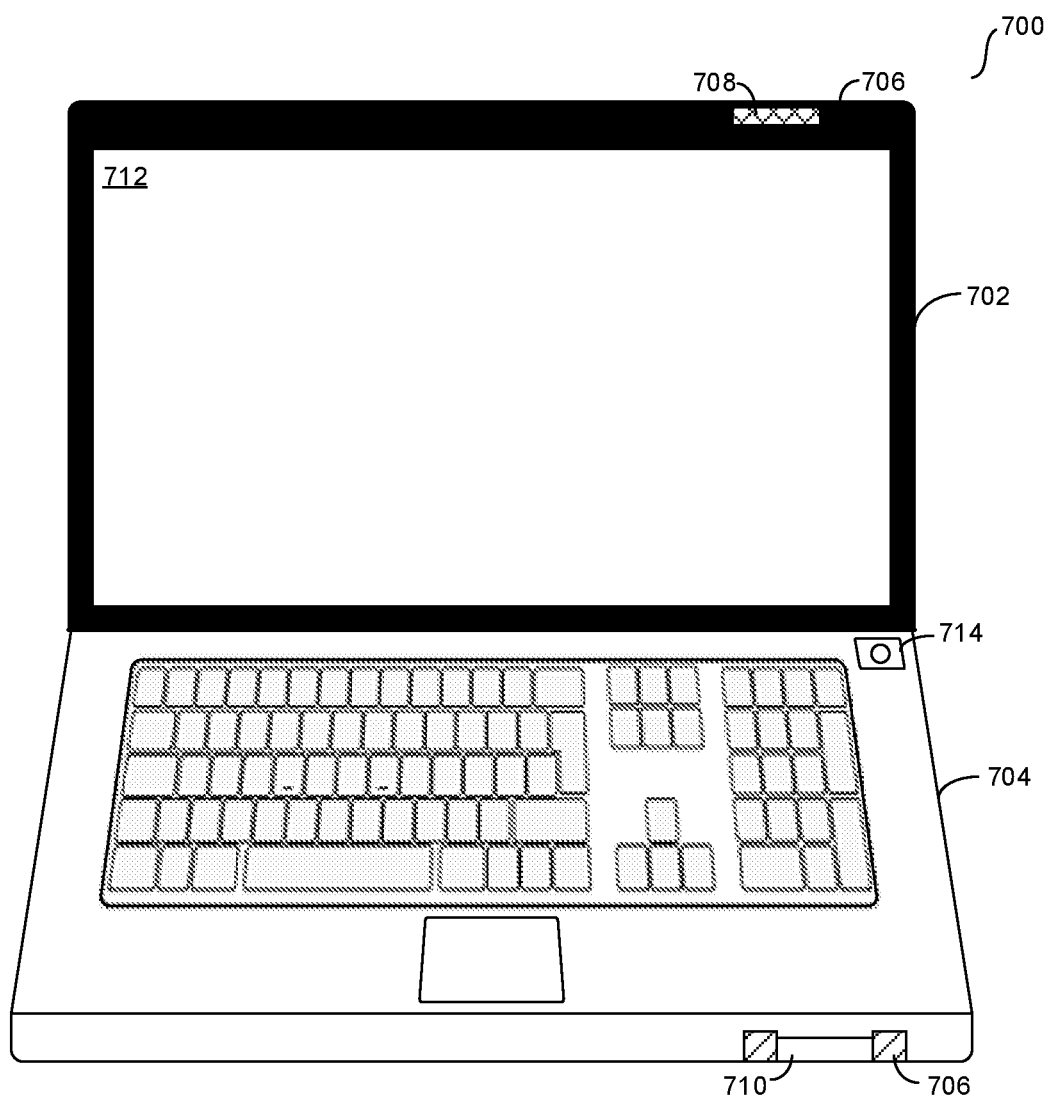

Now in cross-reference to FIGS. 7-9, they show another example device 700 which may also be a laptop computer and may in many respects be substantially similar in function and configuration to the device 400 described above. E.g., the device 700 may include an upper panel 702 at least substantially similar in function and configuration to the upper panel 402 except for the configuration of the portion 706 to be discussed below, a lower panel 704 at least substantially similar in function and configuration to the lower panel 404 except for the configuration of the portion 706 to be discussed below, a display 712 at least substantially similar in function and configuration to the display 410, and a power button/fingerprint reader 714 at least substantially similar in function and configuration to the power button/fingerprint reader 412

In contrast to the device 400, and rather than the recessed portion 406 as shown on the device 400, the device 700 includes a portion 706 which may not be recessed but may instead be e.g. flush with the surrounding portions of the housing of the device 700. Regardless, it is to be understood that the portion 706 is established at least in part by both the upper panel 702 and lower panel 704. Furthermore, the device 700 includes a fingerprint reader established by fingerprint reader portions 708 and 710 respectively on the panels 702 and 704. Thus, e.g., when actuating the device 700 to change configurations from a closed configuration to an open one as shown in FIG. 9 by separating the part of the portion 706 on the upper panel 702 from the part of the portion 706 on the lower panel 704, fingerprint input may be provided to the fingerprint reader in a single (e.g. continuous) gesture or action upon the initial contact of the user 800 against the fingerprint reader portions 708 and 710 (e.g. immediately) prior to transitioning the upper panel 702 away from the lower panel 704. Thus, it may be appreciated that the user 800 may provide input to the portions 708 and 710 as the user initially contacts the portion 706 to slide their finger from down to up from an initial contact point on the lower panel 704, or from an initial contact point on both the upper and lower panels 702 and 704, up against at least part of the upper panel 702 to transition the panel 702 away from the panel 704.

However, note that in addition to or in lieu of the foregoing, it is to also be understood that input may also be provided to only one of the portions 708 and 710 to provide fingerprint input thereto when the device 700 is in the closed configuration, it being also understood that when in the at least partially open position, fingerprint input may be provided to either or both of the portions 708 and 710, as well as the power button/fingerprint reader 714.

Figure 10:
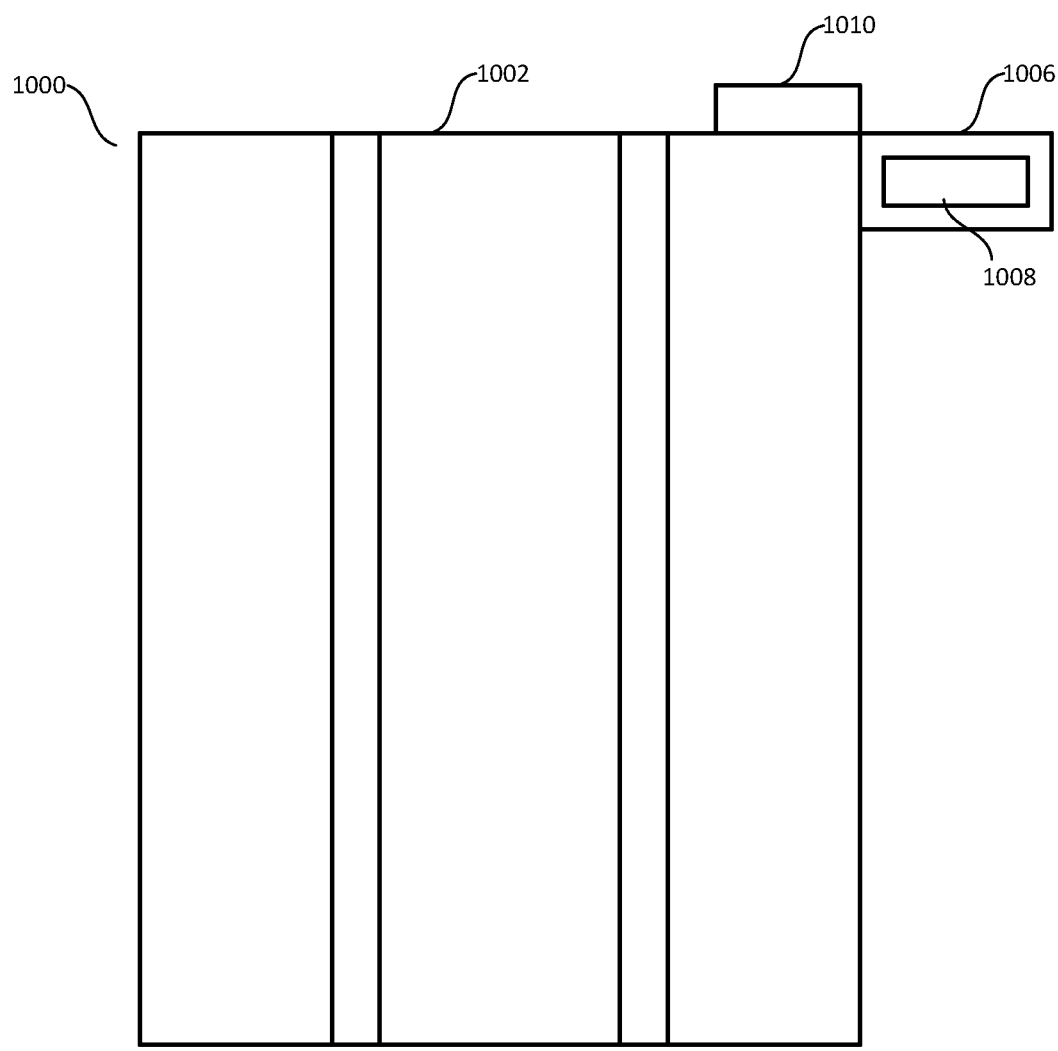
FIGS. 10 and 11 top plan views of example devices in accordance with present principles.
Figure 11:
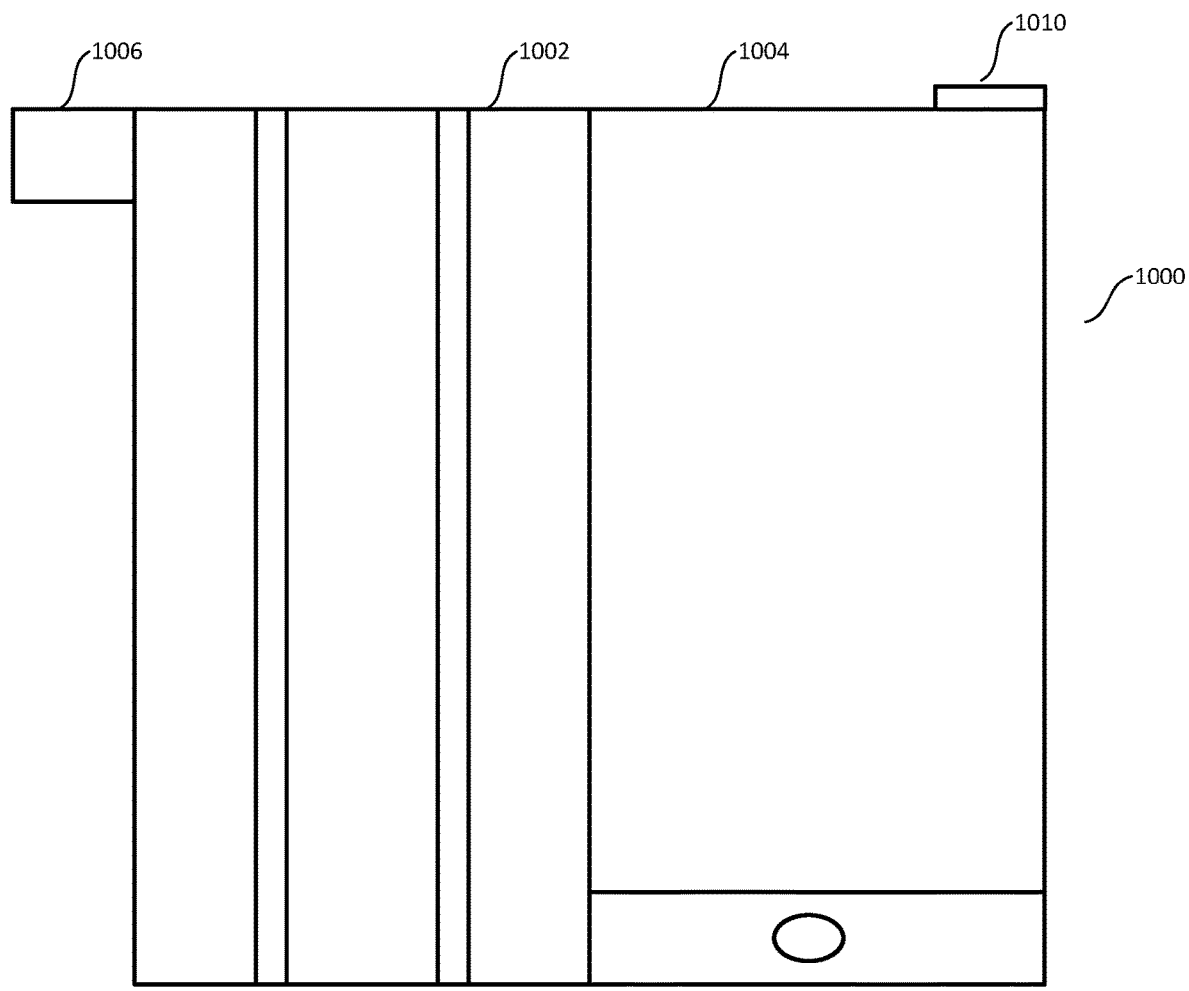

Continuing the detailed description now in cross-reference to FIGS. 10 and 11, they show top plan views of an example device 1000 (e.g. a tablet computer) including a cover 1002 which may be e.g. a so-called "smart" cover and/or a cover in communication with (e.g. via a "smart" hinge connecting the device 100 to the cover 1002), providing input to, and/or sensed by the device 1000 based on e.g. changes in configuration of the cover 1002 relative to the device 1000. Thus, e.g., input may be provided to the device 1000 based on manipulation of the cover 1002 between a configuration in which the cover 1002 at least partially and optionally completely covers a display 1004 of the device 1000 as shown in FIG. 10 and a configuration in which the display 1004 is at least partially and optionally completely uncovered by the cover 1002 as shown in FIG. 11.

Furthermore, as also shown in FIGS. 10 and 11, the cover 1002 may include a tag 1006 with a fingerprint reader 1008 on at least one face thereof, it being understood that a fingerprint reader may be positioned on each side shown of the tag 1006 to thus gather fingerprint data based on a "pinch" gesture at the tag 1006 using a thumb and index finger. In any case, it is to be understood that the cover 1002 may be transitioned from the configuration shown in FIG. 10 to another configuration such as the one shown in FIG. 11 (and vice versa) to thus provide input to the fingerprint reader 1008 and either or both transition the cover 1002 and/or e.g. actuate (e.g. energize and/or illuminate) the display 1004 of the device 1000 in a single (e.g. continuous) gesture or action.

Still in reference to FIGS. 10 and 11, also note that the device 1000 includes a power button/fingerprint reader 1010, which is understood to be selectable to e.g. turn the device 1000 on (e.g. to a fully powered on configuration), to awaken the device from a suspended state and/or hibernation state (or other low-power state), to initiate execution (e.g. "bootup") of one or more operating systems of the device 1000 (e.g. guest operating systems such as Windows, Linux, Android, or Macintosh operations systems), etc. Note that the power selector/fingerprint reader 1010 is also understood to include a fingerprint reader juxtaposed thereon, it being understood that the fingerprint reader is positioned on the power button/fingerprint reader 1010 e.g. to give a unitary appearance to the power button/fingerprint reader 1010 and furthermore is positioned structurally to have a unitary surface with at least the exposed surfaces of the power button/fingerprint reader 1010 so that the fingerprint reader thereon is both e.g. depressible to invoke a power-related function and/or input at the device 1000 and to (e.g. simultaneously) invoke the fingerprint reader itself to provide fingerprint input thereto in a single (e.g. continuous) gesture or action.

Figures 12, 13:
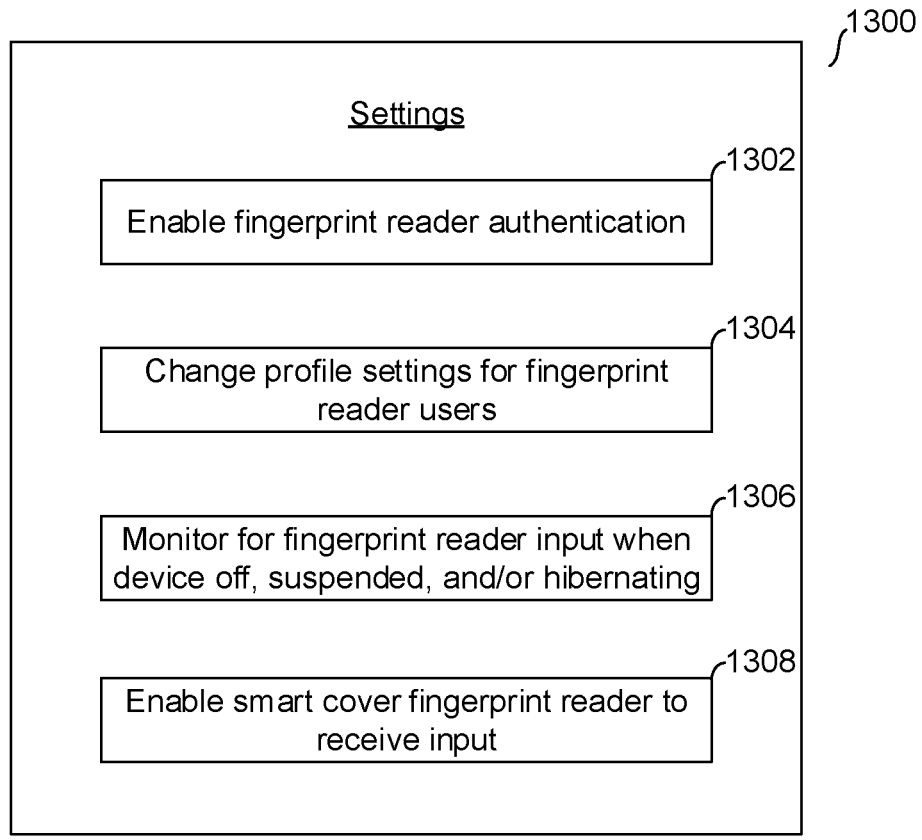
FIG. 12 is an example data table in accordance with present principles.
FIG. 13 is an example user interface (UI) in accordance with present principles.

Now describing FIG. 12, it shows an example data table 1200 that may be used in accordance with present principles. The data table 1200 may be stored on a computer readable storage medium of a device such as the devices described herein. The data table 1200 pertains to settings for the device associated with various particular user profiles that may be identified based on fingerprint input to a fingerprint reader in accordance with present principles. Thus, e.g. once a profile of a user has been identified and/or authentication has been performed based on the user's fingerprint input to the fingerprint reader, the data table 1200 may be accessed at block 316 by the device when undertaking the logic of FIG. 3 to initiate and/or execute the operating system in conformance with one or more settings associated with the identified profile.

As may be appreciate from the table 1200, it includes a first column 1202 listing entries for different profiles, a second column 1204 listing entries for operating systems to initiate and execute based on identification of a particular profile and hence a user's settings for that particular profile, and a third column 1206 listing entries for various particular settings and/or policies to institute and/or conform with when executing the operating system indicated in the respective entry in column 1204. Giving an example, once a device undertaking logic in accordance with present principles identifies a profile based on fingerprint data from a fingerprint reader to which a user's fingerprint was applied, the device may access the data table 1200, locate the row in the table associated with the identified profile based on the profiles listed in the column 1202, identify at the second column 1204 one or more guest operating systems (GOSs) to boot and execute that is indicated in that row, and then boot and/or execute the GOS(s) in conformance with settings indicated at column 1206 for the GOS(s) indicated in that row.

Giving examples of the types of settings which may be indicated in the column 1206 for a given profile, a particular desktop background image may be loaded, one or more particular icons or shortcuts may be provided on the desktop, access may be provided to a particular email account, one or more applications may be automatically launched (e.g. at startup) such as e.g. a programmer A.P.I. or a music player, and/or a particular brightness level for a display of the device may be indicated as well as a particular volume level at which audio is to be rendered at the device.

Reference is now made to FIG. 13, which shows an example settings user interface (UI) 1300 which may be presented on a device in accordance with present principles for configuring settings associated with one or more fingerprint readers on the device. Each of the following selector elements are understood to be selectable to automatically without further user input responsive thereto configure the device to apply the respective setting accordingly. Thus, a first selector element 1302 is shown for enabling fingerprint reader-based authentication of a user (e.g. based on fingerprint input to one or more fingerprint readers on the device) in accordance with present principles. A second selector element 1304 is shown for changing profile settings, and/or for booting and/or executing an operating system per profile settings, based on fingerprint input in accordance with present principles. A third selector element 1306 is shown for monitoring a fingerprint reader for input thereto when the device itself is e.g. off, suspended, hibernating, and/or in another low-power mode in accordance with present principles. Last, a fourth selector element 1308 is shown for enabling a fingerprint reader on a smart cover (e.g. such as the element 1008 described above) to receive input and e.g. perform authentication or load particular profile settings in accordance with present principles.

Without reference to any particular figure, it is to be understood based on present principles that different users providing fingerprint input to a fingerprint reader while seamlessly opening the device in one continuous and/or unitary gesture may be identified, and the device may be configured based on settings associated with that person. Thus, plural users may provide input causing the same device to configure settings differently depending on the user.

What's more, a cover for a device (e.g. the cover 1002 described above) may include a fingerprint reader for present purposes. Even though the cover 1002 was described above as being a cover for a tablet computer, it is to also be understood that covers for other types of devices may also include fingerprint readers in accordance with present principles, such as e.g. a lid cover for a laptop computer. In any case, any of these covers may include a tag with a fingerprint reader thereon.

Further still, it is to be understood that the recesses and/or notches described herein may, based on their structural configurations and/or dimensions, guide a user to a fingerprint sensor thereon from e.g. an initial contact point to the fingerprint sensor which may e.g. juxtaposed next to a protrusion stopping the user's finger at the fingerprint sensor when sliding.

It may now be appreciated that present principles provide methods, devices, and/or systems for e.g. seamlessly providing fingerprint input to a device to authenticate and/or identify a user, thus eliminating what would otherwise be an extra step or action on the part of the user to be authenticated when attempting to access a device. Furthermore, the fingerprint readers disclosed herein are understood to also be available for providing fingerprint input thereto even after e.g. initially configuring the device and/or initiating an operating system.

In addition, referring to a change in power state as described herein, such may include e.g. the device emerging from a suspend mode, the device emerging from a hibernation mode, the device emerging from another low-power mode, powering on previously unpowered and/or low-powered components even such as energizing a display that was off, turning the device itself on, etc.

Before concluding, it is to be understood that although e.g. a software application for undertaking present principles may be vended with a device such as the system 100, present principles apply in instances where such an application is e.g. downloaded from a server to a device over a network such as the Internet. Furthermore, present principles apply in instances where e.g. such an application is included on a computer readable storage medium that is being vended and/or provided, where the computer readable storage medium is not a carrier wave.

While the particular FINGERPRINT READER ON A PORTION OF A DEVICE FOR CHANGING THE CONFIGURATION OF THE DEVICE is herein shown and described in detail, it is to be understood that the subject matter which is encompassed by the present application is limited only by the claims.

What is claimed is:

1. A device, comprising:
    a cover for a display of a touch-enabled device; and
    a fingerprint reader on at least a portion of the cover, wherein the fingerprint reader is disposed on a support projecting outward from the cover, the support being transitionable between a first configuration, in which the support extends laterally beyond a first side of the touch-enabled device, and a second configuration, in which the support extends laterally beyond a second side of the touch-enabled device.

2. The device of claim 1, comprising the touch-enabled device.

3. The device of claim 1, comprising the touch-enabled device, wherein the display is a touch-enabled display.

4. The device of claim 1, wherein the fingerprint reader is disposed on a portion of the cover not configured to cover the display.

5. The device of claim 1, wherein the fingerprint reader is disposed on a portion of the cover engageable by a user to remove the cover from the display when the cover is positioned at least partially on the display, the portion of the cover engageable by the user comprising a surface oriented at an oblique angle with respect to a longitudinal axis of the touch-enabled device.

6. The device of claim 1, wherein the fingerprint reader communicates with the touch-enabled device to provide fingerprint data gathered by the fingerprint reader to the touch-enabled device.

7. The device of claim 1, wherein the fingerprint reader is a first fingerprint reader, and wherein the device comprises a second fingerprint reader coupled to a power button of the device.

8. The device of claim 1, wherein the fingerprint reader is a first fingerprint reader, wherein the cover comprises a second fingerprint reader, and wherein the first fingerprint reader and the second fingerprint reader are disposed on opposing sides of the support.

9. A method comprising:
    providing a cover for a display of a touch-enabled device;
    providing a first fingerprint reader on at least a first surface of a portion of the touch-enabled device; and
    providing a second fingerprint reader on a second surface of the portion, the first surface being opposed to the second surface.

10. The method of claim 9, comprising providing the touch-enabled device.

11. The method of claim 9, comprising providing the touch-enabled device, wherein the display is the touch-enabled device.

12. The method of claim 9, wherein the first fingerprint reader is disposed on a portion of a cover that is not configured to cover the display.

13. The method of claim 9, wherein the first fingerprint reader is disposed on a portion of a cover engageable by a user to remove the cover from the display when the cover is positioned at least partially on the display.

14. The method of claim 9, wherein the first fingerprint reader communicates with the touch-enabled device to provide fingerprint data gathered by the fingerprint reader to the touch-enabled device.

15. A device, comprising:
    a processor;
    storage accessible to the processor;
    a display accessible to the processor;
    a cover that covers the display; and
    a fingerprint reader, a recess being established between the cover and a panel associated with the display when the cover is in a closed position to cover the display, the fingerprint reader being disposed in the recess, the recess being manipulable to move the cover away from the display, the recess comprising a surface oriented at an oblique angle with respect to a longitudinal axis of the device.

16. The device of claim 15, wherein the fingerprint reader is disposed on a portion of the cover that establishes the recess.

* * * * *